US007028827B1

(12) United States Patent
Molbak et al.

(10) Patent No.: US 7,028,827 B1
(45) Date of Patent: Apr. 18, 2006

(54) COIN COUNTER/SORTER AND COUPON/VOUCHER DISPENSING MACHINE AND METHOD

(75) Inventors: Jens H. Molbak, Portola Valley, CA (US); Vae E. Sun, Palo Alto, CA (US)

(73) Assignee: Coinstar, Inc., Bellevue, WA (US)

( * ) Notice: Subject to any disclaimer, the term of this patent is extended or adjusted under 35 U.S.C. 154(b) by 0 days.

(21) Appl. No.: 08/689,826

(22) Filed: Aug. 12, 1996

Related U.S. Application Data

(63) Continuation of application No. 08/255,539, filed on Jun. 6, 1994, now Pat. No. 5,564,546, which is a continuation of application No. 07/940,931, filed on Sep. 4, 1992, now abandoned.

(51) Int. Cl.
*G06F 19/00* (2006.01)

(52) U.S. Cl. ....................... 194/346; 194/347; 235/383

(58) Field of Classification Search ................ 194/216, 194/346, 347, 348; 186/52; 453/3, 8, 17; 235/381, 383
See application file for complete search history.

(56) References Cited

U.S. PATENT DOCUMENTS

| | | | | |
|---|---|---|---|---|
| 446,303 | A | 2/1891 | Thompson | |
| 1,010,993 | A | 12/1911 | White | |
| 1,234,707 | A | 7/1917 | Whistler | 453/8 X |
| 1,711,049 | A | 4/1929 | Fonda et al. | |
| 1,847,940 | A | 3/1932 | Giles | |
| 1,945,948 | A | 2/1934 | Morin | |
| 2,014,505 | A | 9/1935 | Patche | 194/97 |
| 2,317,351 | A | 4/1943 | Andalikiewicz et al. | |
| 2,461,314 | A | 2/1949 | Davis et al. | |
| 2,569,360 | A | 9/1951 | Weingart | 235/100 |
| 2,865,561 | A | 12/1958 | Rosapepe | 232/7 |
| 2,960,377 | A | 1/1960 | Simjian | 346/22 |
| 3,009,555 | A | 11/1961 | Seckula, Sr. | |
| 3,048,251 | A | 8/1962 | Bower | |
| 3,056,132 | A | 9/1962 | Simjian | 346/22 |
| 3,065,467 | A | 11/1962 | Prevost | 346/22 |
| 3,132,654 | A | 5/1964 | Adams | |

(Continued)

FOREIGN PATENT DOCUMENTS

CA 2060630 7/1992

(Continued)

OTHER PUBLICATIONS

Scan Coin AB 1989, Jagershillgatan 26, S-213 75 Malmo, Sweden, Technical Referens Manual, CDS Coin Deposit System, pp. 3-93 (no even p. Nos.).*

(Continued)

*Primary Examiner*—Andrew Joseph Rudy
(74) *Attorney, Agent, or Firm*—Perkins Coie LLP

(57) ABSTRACT

A coin sorting and counting machine and a method for operating it to automatically dispense cash vouchers based on the value of the counted coins, manufacturers' coupons and store coupons. Coins are placed in a hopper tray. When the hinged tray is lifted, the coins travel through a waste management system and into the coin sorting and counting apparatus. The value of the coins and the number of coins within each denomination are displayed as the coins are counted. After sorting, the coins fall into a temporary holding area. At this point the transaction can either be canceled or accepted. If the transaction is canceled, the coins are returned. If the transaction is accepted, the coins fall into a storage area and the user is issued a cash voucher and a series of store coupons. Manufacturers' coupons are dispensed regardless of whether or not the transaction is accepted.

31 Claims, 10 Drawing Sheets

U.S. PATENT DOCUMENTS 3,173,742 A 3/1965 Simjian ........................ 346/22
3,196,257 A 7/1965 Buchholtz et al.
3,396,737 A 8/1968 Piccolo
3,415,348 A 12/1968 Wahlberg
3,599,771 A 8/1971 Hinterstocker .............. 194/318
3,603,327 A 9/1971 Buchholz et al.
3,763,871 A 10/1973 Jobst
3,788,440 A 1/1974 Propice et al.
3,815,717 A 6/1974 Arseneau ................... 194/1 N
3,941,226 A 3/1976 Drakes
3,969,584 A 7/1976 Miller et al. ................... 179/2
3,998,237 A 12/1976 Kressin et al.
4,014,424 A 3/1977 Hall ........................... 194/102
4,036,242 A 7/1977 Breitenstein et al.
4,058,954 A 11/1977 Asami ........................... 53/54
4,059,122 A 11/1977 Kinoshita
4,099,722 A 7/1978 Rodesch et al. ........ 273/143 R
4,100,925 A 7/1978 Fukunaga
4,106,610 A 8/1978 Heiman .................... 194/97 R
4,124,109 A 11/1978 Bissell et al. ............... 194/4 R
4,141,372 A 2/1979 Gdanski
4,167,949 A 9/1979 Hashimoto et al.
4,225,056 A 9/1980 Flubacker ...................... 221/2
4,228,811 A 10/1980 Tanaka et al.
4,230,213 A 10/1980 Spring
4,249,552 A 2/1981 Margolin
4,266,121 A 5/1981 Hirose ........................ 235/381
4,275,751 A 6/1981 Bergman
4,306,644 A 12/1981 Rockola et al.
4,321,672 A 3/1982 Braun et al.
4,346,798 A 8/1982 Agey, III
4,356,829 A 11/1982 Furuya
4,360,034 A 11/1982 Davila et al.
4,369,442 A 1/1983 Werth et al. ........... 340/825.35
4,369,800 A 1/1983 Watanabe et al.
4,374,557 A 2/1983 Sugimoto et al.
4,376,442 A 3/1983 Gomez et al.
4,380,316 A 4/1983 Glinka et al. ................. 232/16
4,383,540 A 5/1983 De Meyer et al.
4,398,550 A 8/1983 Shireman
4,412,292 A 10/1983 Sedam et al. ............... 364/479
4,412,607 A 11/1983 Collins et al.
4,434,359 A 2/1984 Watanabe ................... 235/379
4,436,103 A 3/1984 Dick
4,442,850 A 4/1984 Austin et al.
4,503,963 A 3/1985 Steiner ....................... 194/4 C
4,504,357 A 3/1985 Holbein et al.
4,509,122 A 4/1985 Agnew et al. .............. 364/200
4,509,633 A 4/1985 Chow
4,542,817 A 9/1985 Paulson
4,543,969 A 10/1985 Rasmussen
4,554,446 A 11/1985 Murphy et al. ............. 235/487
4,558,711 A 12/1985 Yoshiaki et al.
4,577,744 A 3/1986 Doucet
4,587,984 A 5/1986 Levasseur et al.
4,598,378 A 7/1986 Giacomo .................... 364/479
4,611,205 A 9/1986 Eglise ................... 340/825.35
4,616,776 A 10/1986 Blumenthal et al. ........ 232/4 R
4,620,559 A 11/1986 Childers
4,622,456 A 11/1986 Naruto et al. ............... 235/379
4,694,845 A 9/1987 Zay ............................ 453/59
4,706,577 A 11/1987 Jones ....................... 109/59 T
4,706,795 A 11/1987 Mikami et al. ............. 194/317
4,716,799 A 1/1988 Hartmann ...................... 83/42
4,723,212 A 2/1988 Mindrum et al. ........... 364/401
4,733,765 A * 3/1988 Watanabe .............. 271/3.12 X
4,753,625 A 6/1988 Okada ......................... 453/32
4,775,353 A 10/1988 Childers et al. ............... 435/6
4,775,354 A 10/1988 Rasmussen et al. .......... 453/10
4,809,837 A 3/1989 Hayashi ...................... 194/205
4,814,589 A 3/1989 Storch et al. ............... 235/375
4,831,374 A 5/1989 Masel ................... 340/825.31
4,833,308 A 5/1989 Humble ...................... 235/383
4,883,158 A 11/1989 Kobayashi et al. ......... 194/217
4,884,672 A 12/1989 Parker ........................ 194/318
4,896,791 A 1/1990 Smith ............................ 221/7
4,898,564 A 2/1990 Gunn et al. .................... 453/3
4,910,672 A 3/1990 Off et al. .................... 364/405
4,921,463 A 5/1990 Primdahl et al. .............. 453/3
4,936,436 A 6/1990 Keltner ....................... 194/318
4,953,086 A 8/1990 Fukatsu ...................... 364/408
4,959,624 A 9/1990 Higgins, Jr. et al. ........ 331/116
4,963,118 A 10/1990 Gunn et al. .................... 453/3
4,964,495 A 10/1990 Rasmussen ................. 194/344
4,969,549 A 11/1990 Eglise ........................ 194/205
4,978,322 A 12/1990 Paulsen ....................... 453/57
4,995,848 A 2/1991 Goh ............................. 453/3
4,997,406 A 3/1991 Horiguchi et al. ............ 453/57
5,010,238 A 4/1991 Kadono et al.
5,021,967 A 6/1991 Smith ......................... 364/479
5,025,139 A 6/1991 Halliburton, Jr. ........... 235/379
5,027,937 A 7/1991 Parish et al. ................ 194/348
5,039,848 A 8/1991 Stoken ....................... 235/381
5,040,657 A 8/1991 Gunn et al. ................. 194/317
5,056,644 A 10/1991 Parker ........................ 194/318
5,073,767 A 12/1991 Holmes et al. ........ 340/311.13
5,083,765 A 1/1992 Kringel ...................... 271/118
5,083,814 A 1/1992 Guinta et al.
5,088,587 A 2/1992 Goodrich et al. ........... 194/345
5,091,713 A 2/1992 Horne et al. ................ 340/541
5,098,339 A 3/1992 Dabrowski ................... 453/30
5,100,367 A 3/1992 Abe
5,173,851 A 12/1992 Off et al. .................... 364/401
5,174,608 A 12/1992 Benardelli
5,183,142 A 2/1993 Latchinian et al. ......... 194/206
5,219,059 A 6/1993 Furuya et al. .............. 194/200
5,236,339 A 8/1993 Nishiumi et al. ........... 194/343
5,251,738 A 10/1993 Dabrowski .................. 194/206
5,293,981 A 3/1994 Abe et al. ................... 194/345
5,299,673 A 4/1994 Wu ............................ 194/345
5,302,811 A 4/1994 Fukatsu ...................... 235/381
5,316,120 A 5/1994 Ibarrola ...................... 194/318
5,321,242 A 6/1994 Heath, Jr. ................... 235/382
5,330,041 A 7/1994 Dobbins et al. ............ 194/206
5,374,814 A 12/1994 Kako et al. ................. 235/379
5,388,680 A 2/1995 Hird et al. .................. 194/345
5,429,222 A 7/1995 Delay ......................... 194/343
5,435,777 A 7/1995 Takatani et al.
5,441,139 A 8/1995 Abe et al. ................... 194/347
5,449,058 A 9/1995 Kotler et al. ............... 194/344
5,469,951 A 11/1995 Takemoto et al. .......... 194/206
5,513,738 A 5/1996 Hird et al. .................. 194/345
5,560,467 A 10/1996 Takemoto et al. .......... 194/207
5,564,546 A 10/1996 Molbak et al. ......... 194/347 X
5,620,079 A 4/1997 Molbak
5,842,916 A 12/1998 Gerrity et al.
5,909,794 A 6/1999 Molbak et al.
6,349,972 B1 2/2002 Geiger et al.
6,494,776 B1 12/2002 Molbak

FOREIGN PATENT DOCUMENTS

CA 2067987 7/1992
CA 2060630 2/1999
DE 660 354 5/1938
DE 25 28 735 4/1976
DE 30 21 327 12/1981
EP 0 351 217 A2 1/1990
EP 0 420 163 A1 4/1991
EP 0 477 722 A2 4/1992
FR 2 042 254 2/1971
FR 2 342 531 9/1977
GB 958741 5/1964
GB 2 121 582 12/1983

| | | | |
|---|---|---|---|
| GB | 2 153 128 A | 8/1985 |
| GB | 2 175 427 | 11/1986 |
| GB | 2 186 411 A | 8/1987 |
| GB | 2 198 274 | 6/1988 |
| GB | 2 223 340 A | 4/1990 |
| GB | 2 223 872 | 4/1990 |
| GB | 2 255 666 | 11/1992 |
| JP | 52-50296 | 1/1977 |
| JP | 52-49892 | 4/1977 |
| JP | 1-258092 | 10/1989 |
| JP | 1-307891 | 12/1989 |
| JP | 3-63795 | 3/1991 |
| JP | 3-92994 | 4/1991 |
| JP | 4-344995 | 12/1992 |
| SE | 44-244 | 9/1988 |
| SE | 44-247 | 9/1988 |
| SE | 50-250 | 8/1991 |
| WO | US93/07846 | 4/1994 |
| WO | WO 04/09440 | 4/1994 |
| WO | WO 96/30877 | 10/1996 |

OTHER PUBLICATIONS

Hamilton, "Turning Cans Into Cold Cash", *The Washington Post*, Jul. 2, 1991, pp. D1 and D4, 194-209.
Reis Eurosystems Geldbearbeitungssysteme, "Test—Programme CS 3110 Selectronic coin sorting and counting machine", Jul. 1992, pp. 1-3.
Reis Eurosystems, "Operating Instructions CS 3110 Selectronic Coin Sorting and Counting Machine with Central Sensor", Jul. 1992, pp. 1-12, I-IV.
"Slide Changing Apparatus With Slide Jam Protection", Research Disclosure 30509, Sep. 1989.
F. Zimmerman & Co., "Reference Manual Contovit/Sortovit, Perconta Money Counting and Sorting Systems", Aug. 1995, pp. I-III, 1-31 and three pages of specifications.
Scan Coin Geldbearbeitungssysteme, Die Preise verstehen sich zzgl. Gesetzlicher Mehrwertsteuer, Stand 1.10, 1988.
Case-ICC Limited, CDS Automated receipt giving cash deposit system.
KUNDENSELBSTBEDIEUNG, Geldzählen. u. -wechseln im SB-Bereich—Die Kunden zählen für Siel.
BEDIENUNGSANLEITUNG CDS 500/MCC 500 Instructions Book.
Munzgeldeinzahlungen in Selbstbedienung: Cash Deponier System CDS 500.
Technical Manual, Cash Deposit System Model CDS 600 & CDS 640.
Technical Specificatio ns GBS9401 SB, Copyright Fa.GBS-Geldbearbeitungssysteme A-8101 Gartkorn, HarterstraBe 29.
Scan Coin Techncial Referns [sic] Manual CDS (odd pages only).
Scan Coin Money Processing Systems.
"Royal Bank opens 'super branch'", Murray Oxby, The Gazette Montreal, Sep. 14, 1991.
"High-tech bank counts coins", Innovations, Carolyn Leitch, Report On Business, Sep. 16, 1991.
"Royal's Burlington drive-in bank provides customers 24-hour tellers", Jade Ilemeon, Business Today, The Toronto Star, Aug. 21, 1991.
"Bank blends new technology with service", Martin Cash, Winnepeg Free Press, Sep. 4, 1992.
Scan Coin International Reports.
Super Branch Literature.
Scan Coin Technical Manual CDS MK 1, Coin Deposit System.
User's Manual Scan Coin CDS 600.
User's Manual Scan Coin CDS 640.
Scan Coin Service/Technical Manual SC 102 Value Counter.
Scan Coin CDS 640 Cash Deposit System Brochure.
Accessories Brochure.
Geldinstitute Literature.
Scan Coin World Newsletters, Scan Coin AB, Jagerhillgatan 26, S-213 75 Malmo, Sweden.
Scan Coin Sales Invoices for Coin Counters in the United States.
Scan Coin CDS Brochure.
Scan Coin Newsletters.
Newspaper Articles, The Globe and Mail, Sep. 18, 1991.
Scan Coin Correspondence regarding Supermarkets.
Correspondence between Scan Coin and Coinstar.
Complaint For Infringement Of U.S. Letters Patent No. 5,564,546, Dated Jun. 17, 1997, Case No. C-97 20536 EAI.
Answer To Complaint For Patent Infringement And Counterclaim For Declaratory Judgment, Dated Jun. 26, 1997, Case No. C-97 20536 EAI.
First Amended Answer To Complaint For Patent Infringement And Counterclaim For Declaratory Judgment, Dated Aug. 13, 1997, Case No. C-97 20536 EAI.
Order Granting Counter-Defendant's (1) Motion To Dismiss Counterclaim For Declaratory Judgement Based On Unenforceability And (2) Motion To Strike Inequitable Conduct Affirmative Defense, Ordered Sep. 8, 1997, No. C97-20536 EAI.
Second Amended And Supplemental Answer To Complaint For Patent Infringement And Counterclaim For Declaratory Judgement, Dated Sep. 27, 1997, Case No. C-97 20536 EAI.
Scan Coin AB's Answers to Coinbank's First Set of Interoogatories (Nos. 1-13), Executed on Nov. 3, 1997.
CoinBank Automated Systems, Inc.'s Initital Disclosure of Prior Art Pursuant to Local Rule 16-7, Case No. C-97 20536 EAI, Nov. 20, 1997.
Scan Coin Technical Manual CDS MK 1 Coin Deposit System; pp. 1-31.
Scan Coin Technical Referens Manual CDS Coin Deposit System.
Answer to Amended Complaint for Patent Infringement and Counterclaim for Declaratory Judgment; Case No. C-97 20536. E.I.; United States District court; Northern District of California, San Jose Division; filed Nov. 2, 1998.
Coinbank Automated Systems, Inc.'s Response to Coinstar Inc's Third Set of Interrogatories; Coinstar, Inc. v. Coinbank Automated Systems, Inc.; Case No. C-97 20536 EAI; United States District Court for the Northern District of California, San Jose Division; filed Mar. 15, 1999.
Australian Patent Office; *Examiner's First Report;* May 11, 1999; for corresponding Australian application.

* cited by examiner

COIN COUNTER/SORTER AND COUPON/VOUCHER DISPENSING MACHINE AND METHOD

This is a continuation of application Ser. No. 08/255,539 filed Jun. 6, 1994, now U.S. Pat. No. 5,564,546 which is a continutation of 07/940,931, filed Sep. 4, 1992, now abandoned incorporated herein by reference

BACKGROUND OF THE INVENTION

The present invention relates to coupon dispensing machines and coin sorting machines.

There are a variety of machines which dispense stamps, tickets, coupons, money orders, bank transactions or the like. One type of machine, shown in U.S. Pat. No. 5,039,848 to Raymond Stoken, dispenses coupons in exchange for money. A display area indicates the different coupons available as well as the specific amount of money required to obtain each particular coupon. Money is inserted into the machine via a coin slot. Control circuitry determines which coupon has been selected, the amount of money required to purchase this coupon, and if the correct amount of money has been inserted into the coin slot. The control circuitry then causes the coupon dispenser to dispense the requested coupon.

Other machines dispense other types of products. For instance, U.S. Pat. No. 5,021,967 to Lawrence Smith is a money order dispensing machine. This machine is meant to be operated by a system operator, not a customer, and therefore does not require the capability to receive money. The machine prints money orders on a dot matrix printer after receiving the necessary data inputs from the operator.

A different variety of machines has been patented which sort coins. One such machine, shown in U.S. Pat. No. 4,995,848 to David Goh uses two methods to sort coins, both methods based on the diameter of the coins. In this machine the coins are loaded into a hopper. A rotating wheel feeds the coins individually onto an inclined ramp. The coins roll down the ramp with their rear surfaces resting against a support surface. Specific denominations are selected when they fall through slots of varying size located in the support surface. Specific denominations are also selected using peeler knives which are arranged at different distances from the ramp surface. These knives topple the coins from the ramp into bins. Using both techniques allows a short ramp to be employed. Another type of machine shown in U.S. Pat. No. 4,059,122 to Yoshio Kinoshita counts the number of coins according to denomination after sorting the coins.

SUMMARY OF THE INVENTION

The present invention provides an apparatus which can receive a number of unsorted coins. The coins are sorted and counted to determine a total value. The user is issued a voucher for an amount related to the total value.

The present invention offers a valuable service to the retailer in whose store this machine is placed as well as to the actual user. People tend to collect coins at home, finding that carrying large quantities of coins is unwieldy and impractical. Furthermore, spending coins normally requires either placing the coins singularly into product dispensing machines or counting the coins out by hand. This invention allows the user to periodically exchange excess coins for cash vouchers. The user need not first count the coins since the present invention automatically counts the coins. The advantages to the retailer are numerous. First, although the voucher is exchangeable for cash or merchandise, most customers are likely to purchase goods at the store where they exchange their coins. Second, by offering a convenience to their customers, retailers gain the goodwill of these customers. Thus, the present invention provides a voucher issuing machine in which the amount of the voucher is not preset, and also allows coin sorting by a typical consumer.

In the preferred embodiment coins are placed in a hinged hopper tray built into one of the machine's surfaces. To activate the process the user presses a "go" button and then lifts one edge of the tray, causing the coins to fall down a chute to the high speed coin sorting and counting mechanism. Coins are counted and sorted by denomination and then dropped into a temporary holding area called an escrow tray. As the coins are counted, the total monetary value is displayed on a video screen as well as the number of coins counted within each denomination. After all of the coins have been counted, the user is asked to make a decision, either rejecting the transaction or allowing the transaction to proceed. If the transaction is rejected, the coins are returned to the user via a return chute. If the transaction is accepted, the coins are dropped into separate bins or trays based upon their denomination. This triggers the controller to print and dispense a cash voucher to the user via a slot in the machine's surface.

Besides exchanging cash vouchers for coins, in the preferred embodiment the invention dispenses manufacturers' coupons from a separate slot redeemable for various bargains. These coupons are dispensed at no cost to the user. A second type of coupon to be dispensed in the preferred embodiment are store coupons. These coupons are printed by the cash voucher printer and dispensed through the same slot as the cash vouchers and are good only for specific bargains unique to that store. For example, the store manager may have a surplus of a particular item and therefore wish to offer a "two-for-one" bargain for a limited time. Selected products and bargains may also be promoted on the video display. These promotional techniques have the advantage of being easily alterable; thus an individual store manager can tailor the store coupons/ads depending upon factors such as the time of day (e.g., midday grocery store shoppers versus after work shoppers versus late night shoppers) while the chain store owner can vary the store coupons/ads depending upon a particular store's location and needs (e.g., deli shop versus bakery shop versus floral shop).

Generally, in the prior art, coins are either inserted into a machine singularly, or in the case of large commercial sorting machines, by trained personnel. In the present invention, non-trained personnel will dump large amounts of coins into the hopper tray. These untrained users are likely to empty their personal containers, such as old cans or bottles, directly into the hopper without first inspecting the coins. Thus lint, tokens, and various other objects will probably accompany the coins into the machine. Therefore a method of waste management is necessary to insure that the machine is not damaged during use.

In the preferred embodiment, the user dumps coins into a hopper tray which doubles as an inspection area. The bottom of the hopper tray is perforated, thus allowing small foreign objects to fall through the perforations instead of entering the coin sorting mechanism. While the coins are in the hopper, the user has an opportunity to remove large foreign objects. After inspecting the coins, the user first presses a "go" button indicating they wish to use the machine, and then lifts one edge of the hinged tray, causing the coins to fall down a waste management chute. This chute leads to the coin sorting and counting mechanism. In the preferred embodiment, when the "go" button is pressed, the coin sorter starts, the coin counter is initialized, and a fan within the waste management chute is activated. The fan blows light weight debris, such as lint and dust, out of the chute and away from the coin counter/sorter mechanism. The bottom surface of the waste management chute is a grooved and porous plate which allows any fluids dumped into the machine to be removed from the coins and collected. This helps to avoid possible damage to the machine. Magnetic strips are placed along the entrance and exit areas of the chute to extract any magnetic tokens which may have been included with the coins.

Many people have an intrinsic distrust of machines, especially with regards to machines handling their money, and therefore it is desirable to quickly gain the user's trust. This invention has several features which accomplish this goal. First, the front of the machine is clear, encouraging user trust since the flow of coins can be watched throughout the process. Second, until the voucher is issued, the user is in control of the process. Prior to issuing the voucher the display indicates the amount of the coins counted. At this point the user can either agree with the amount and allow the transaction to proceed, or can reject the amount and have the coins returned. Until the user makes this decision, the coins are kept in a temporary holding area called an escrow tray. In the preferred embodiment, the basic escrow tray is immobile although the bottom surface of the tray can be manipulated. Through the manipulation of this surface, the coins are either returned to the user or dumped into a storage bin within the machine.

DESCRIPTION OF THE SPECIFIC EMBODIMENT(S)

Figure 1:
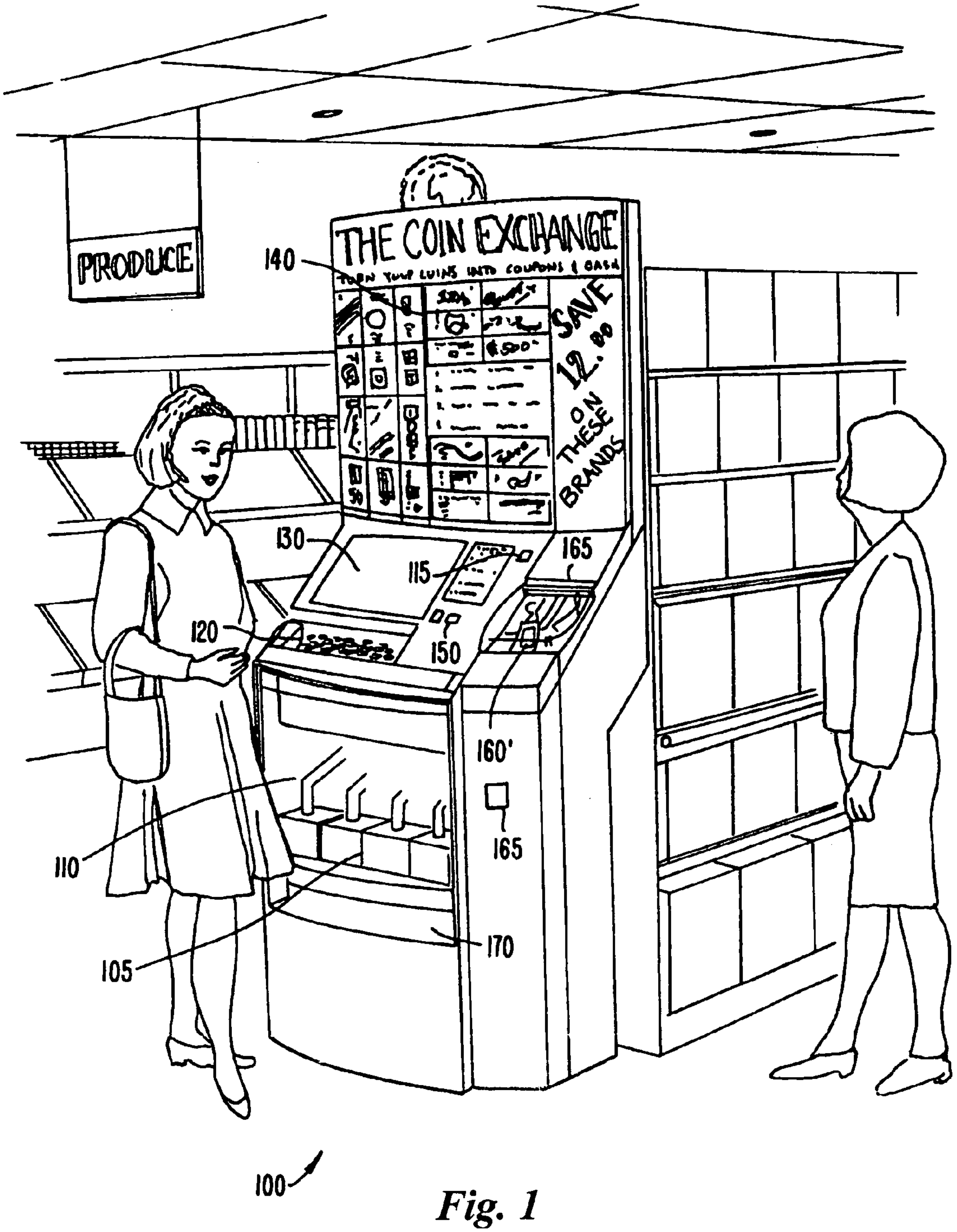
FIG. 1 is an illustration of an embodiment of the coin exchange apparatus in a likely environment.

FIG. 1 is an illustration of the coin exchange kiosk 100 in a possible environment; a supermarket. Kiosk 100 is freestanding, and has been designed with a small footprint to minimize the required floor space. The lower front surface 110 is clear, allowing the user to watch the coins as they are separated, counted, and dropped into escrow tray 105. By making the process visible to the user, trust in the machine is encouraged. Furthermore, since watching the sorting process is interesting, the user becomes integrated into the machine's operation and is further encouraged to use the machine.

Initially the coins are placed in coin tray 120 where small foreign objects fall through perforations in the bottom of the tray and the user can remove large foreign materials prior to coin sorting. When the user is ready to begin the sorting process, they must push "go" button 115. Button 115 initializes the coin counter, activates the coin sorter, and activates the fan within the waste management chute. If the system does not detect coins within a predetermined period of time, both the coin sorter and the fan are deactivated. The user next raises the edge of tray 120. The tray is hinged on the right side and acts as a chute to funnel the coins into the kiosk. User directions, transaction information, store bargains, and advertisements appear on video screen 130. Screen 130 can also be used to show attention getting displays in order to attract potential users. Once the coins are admitted into the kiosk and the go button has been pushed, the waste removal and coin sorting process begins. During the coin sorting process, coins which do not meet the necessary physical criteria are rejected and returned to the user via chute 165. In the preferred embodiment, as the coins are counted the video screen displays both the total monetary value and the number of coins collected within each denomination.

At the conclusion of the sorting process, the user is asked to either accept the stated coin value and continue the transaction, or cancel the transaction. This selection is made by pushing one of two buttons 150. If the user continues the transaction, then the coins in the escrow tray 105 are dumped into a depository and the user is issued a voucher through slot 160. In the preferred embodiment, the voucher is worth the value of the counted coins and is redeemable at the retailer's cashier for cash or credit towards purchases. Store coupons, printed by the voucher printer and good towards store bargains, are dispensed with the cash voucher. Manufacturers' coupons are dispensed through an adjoining slot 165 at no cost to the user. If the user cancels the transaction the coins are returned in area 170. The upper back portion 140 of kiosk 100 is a display board where advertisements and notices can be placed. Display board 140 can also be used to indicate what coupons the machine is currently dispensing.

Figure 2:
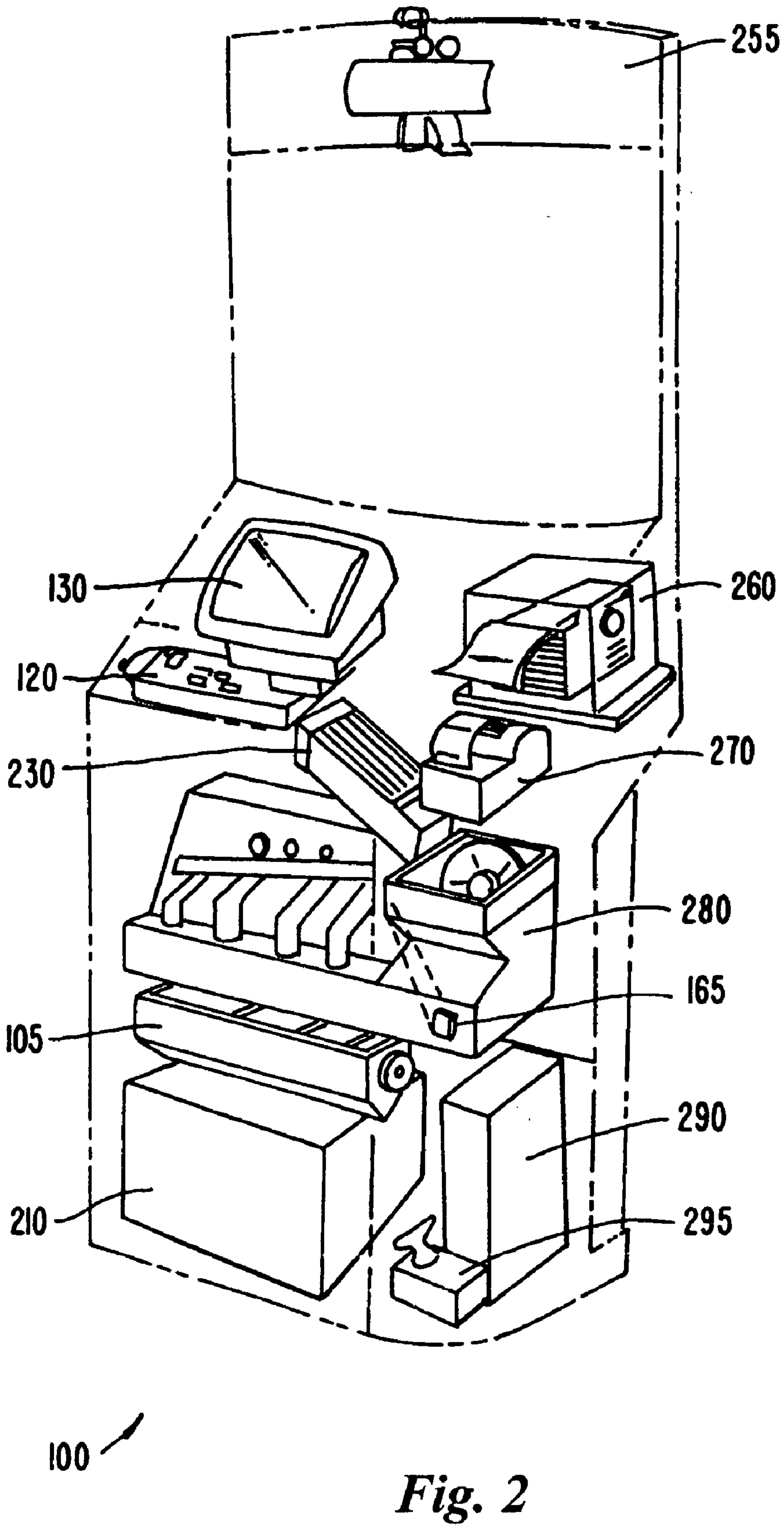
FIG. 2 is a diagram showing the internal layout of the principal components in the preferred embodiment.

The internal layout of kiosk 100 is shown in FIG. 2. The coin storage area 210 holds the coins after the transaction has been completed. Area 210 can either be separated into large capacity bins to hold each denomination, or into ready to use coin trays. When the storage area is close to capacity, an indicator 255 on the outside of the kiosk 100 notifies store personnel to empty the storage area 210.

The outside of the waste management system 230 is visible in this diagram. Liquids fall through the porous, grooved bottom plate of system 230 while lint and other fine materials are blown away by a small fan located in the chute. Liquids are collected in a waste receptacle. At the end of system 230, the coins are funneled into the coin counter and sorter 280. This is a commercially available sorter. Several manufacturers make suitable machines, although in the preferred embodiment a Scan Coin Model 109 with a modified hopper is used. The counter accepts mixed coins and is able to detect foreign coins and slugs. Rejected coins are returned to the user through chute 165.

Two different printers are used in the preferred embodiment of the kiosk. Printer 270 is used to print the cash vouchers and the store coupons. The preferred embodiment uses an Epson TM267 printer. Besides containing the amount of the voucher, the voucher will also contain other information such as store name, transaction number, bar codes, etc in order to make counterfeiting difficult. Special papers and inks can also be used to discourage counterfeiting. In the preferred embodiment, a separate printer 295 makes a continuous record of each transaction. This printer is an Epson RP265. In a second embodiment printer 270 serves a double function. Besides printing the vouchers, upon command by store personnel this printer prints out all of the pertinent transactional information. CPU 290 also stores this information.

In the preferred embodiment, VGA screen 250 is a Super VGA monitor; CPU 290 is a Belmont, 386, 40 MHz CPU; and high capacity sheet feeder 260 is a modified 1000 sheet feeder manufactured by Gradco, model number HCF-1000. Warning light 255 warns store personnel when either printer is low on paper, the sheet feeder is low on paper, or there has been a system malfunction.

Figure 3:
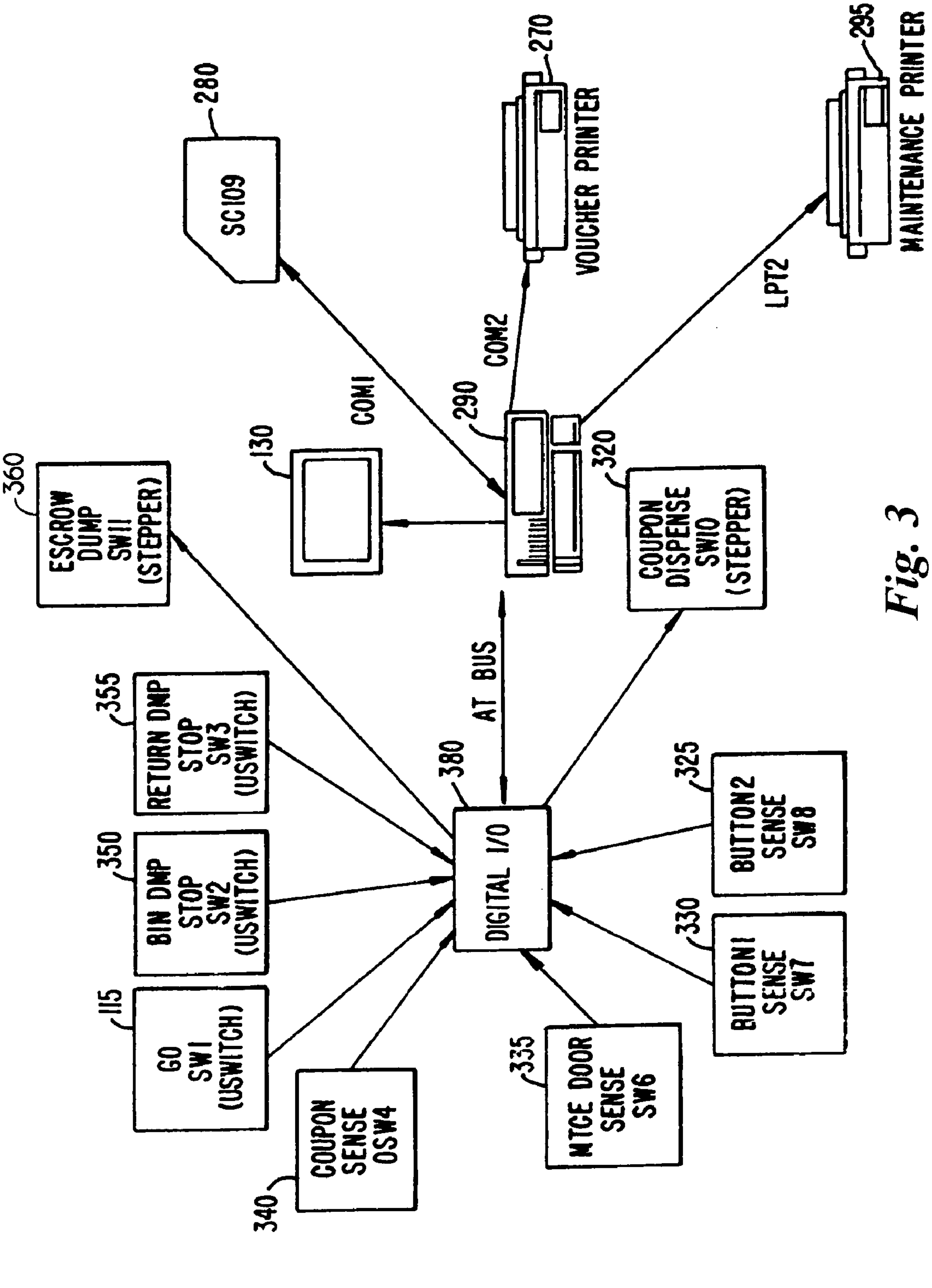
FIG. 3 is a block diagram of the system level electronic functions.

FIG. 3 is a block diagram of the system level electronic functions. The entire system is controlled by CPU 290. System information is presented on display 130 which is the same monitor used to communicate with the user. System inputs are coupled to CPU 290 via data bus 380. Push button switches 330 and 325 are used by the user to either accept or cancel the transaction. Switch 335 is a maintenance switch which is used by store personnel to command the system to download system information to either the maintenance printer 295 or to a floppy disk. The maintenance switch may also be used to enter a mode to allow clearing of coin jams and an internal store coin counting mode. This internal store coin counting mode will enable the retailer to sort and count coins from vending machines and cash registers, bypassing the voucher and coupon functions. Leading edge sensor 340 tells the system each time a sheet of coupons has been dispensed. Stepping motor 320 dispenses the coupon sheets. Push button switch 115 is depressed by the user to initialize the counting system and activate both the coin counter/sorter 280 and the waste management fan. Microswitches 350 and 355 deactivate escrow tray stepping motor 360, thus preventing possible mechanical damage by the stepping motor moving the tray past its designated limits, and indicate to CPU 290 the position of the escrow tray (i.e., at-rest position, returning coins to the user position, or dumping coins into the machine's storage area position). CPU 290 also controls the voucher printer 270.

Figure 4:
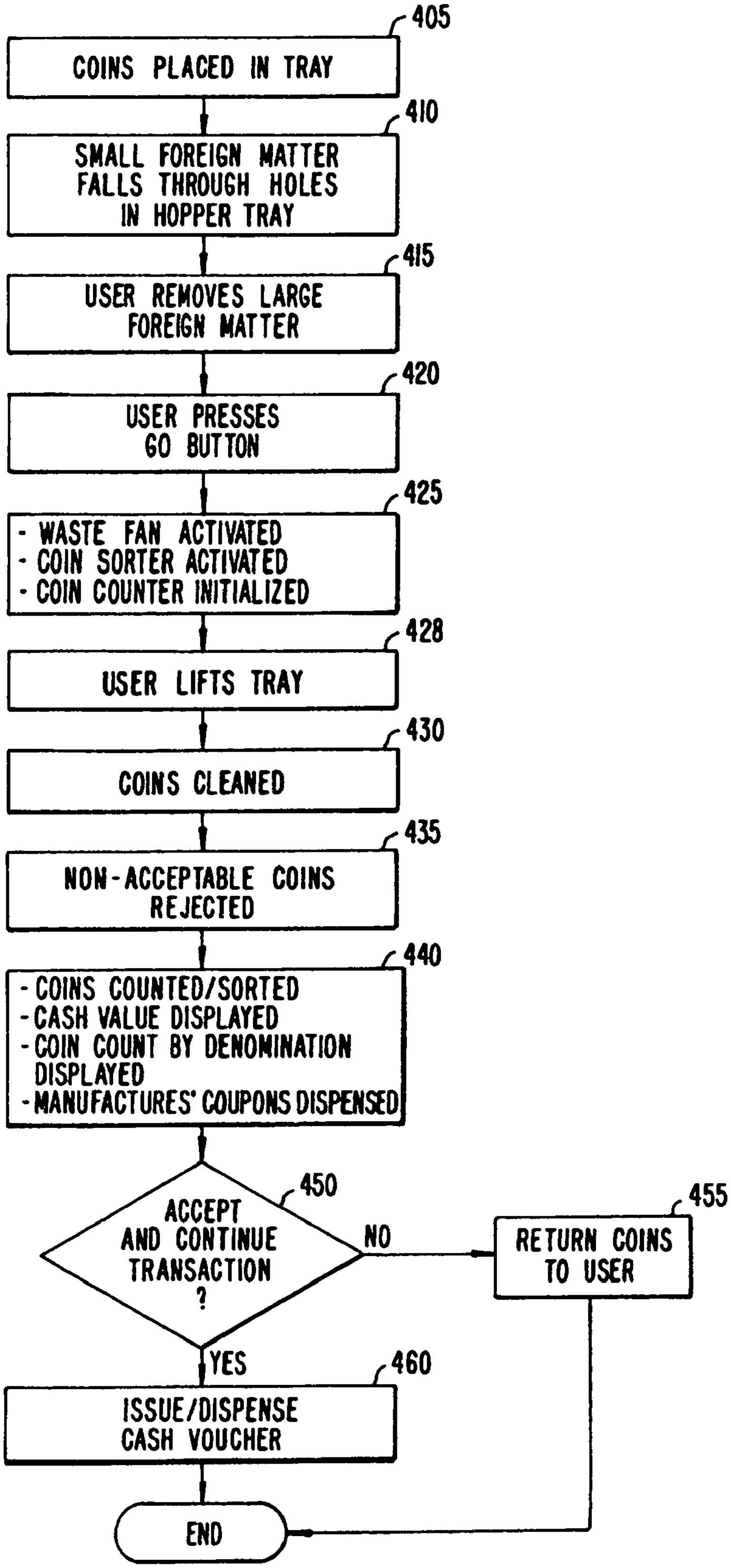
FIG. 4 is a flow chart of the operation of the system.

The flowchart of FIG. 4 illustrates the operation of the coin exchange kiosk in its preferred embodiment. The user places coins of varying denominations into the external tray (step 405). Small foreign matter falls through perforations in the bottom of the hopper tray (step 410) while large foreign matter is removed by the user (step 415). When the user is ready to begin using the machine, they press the "go" button (step 420). Pressing the go button activates the coin sorter, initializes the coin counter, and activates the fan within the waste management chute (step 425). Next the user lifts the edge of the hopper tray, dumping the coins down the entrance chute of the waste management system (step 428). As the coins go through the waste management system certain waste, such as liquids, are removed (step 430). The coins are then counted and sorted (step 440). During this step coins which do not meet the necessary physical criteria are rejected and returned to the user (step 435). As the coins are counted, the value of the coins is displayed on the monitor as well as the number of coins counted within each denomination (step 440). Manufacturers' coupons are dispensed at this time (step 440). After all of the coins are counted, the user is asked to either accept the value that has been determined and continue the transaction or to reject the value and discontinue the transaction (step 450). If the user decides to reject the stated value then the coins are returned (step 455). If the user decides to accept the stated value and continue the transaction then a cash voucher is dispensed for the stated value (step 460).

Figure 5:
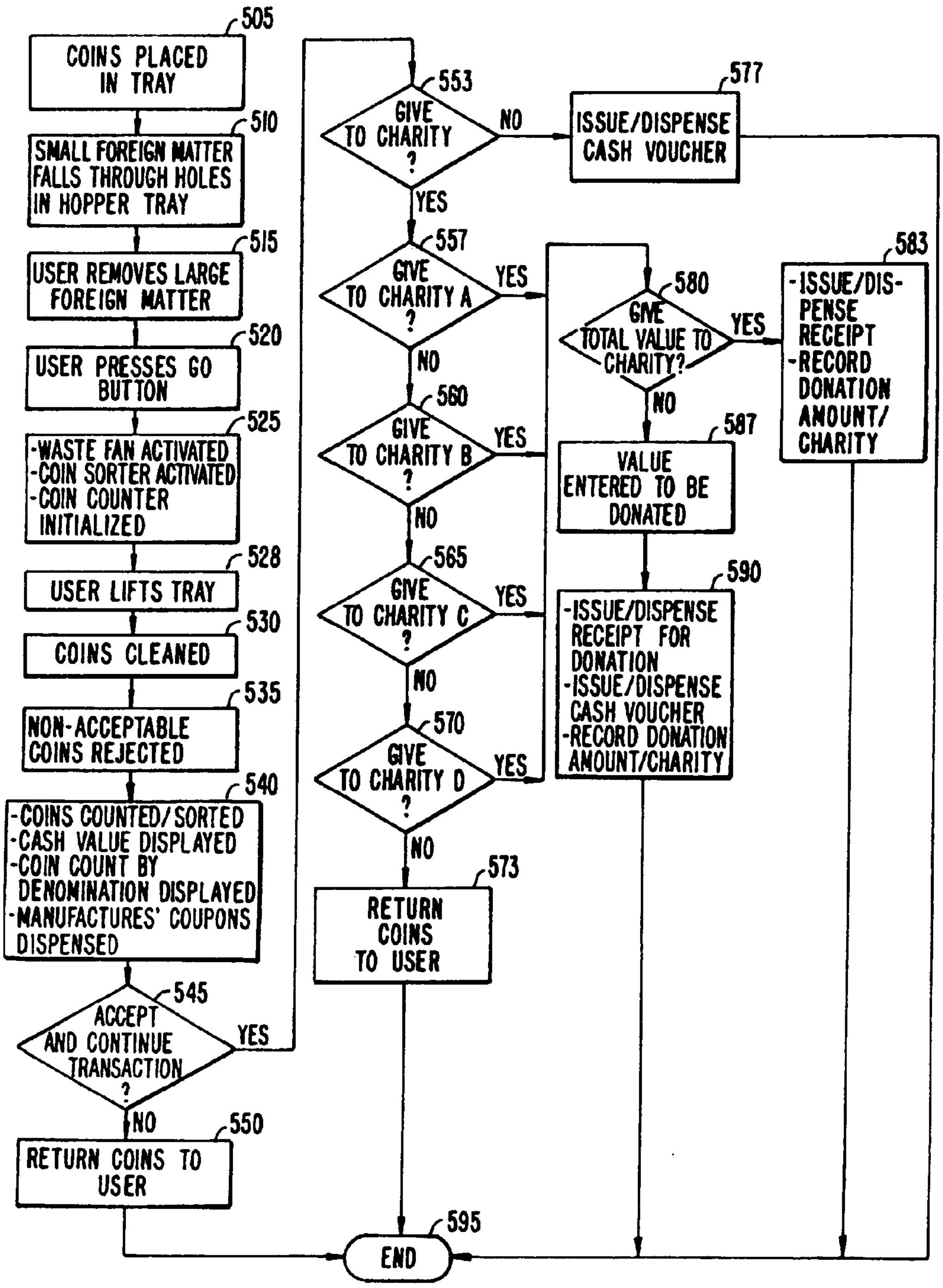
FIG. 5 is a flow chart of the operation of a second embodiment of the system.

The flowchart of FIG. 5 illustrates the operation of the coin exchange kiosk in a second embodiment. The user places coins of varying denominations into the external tray (step 505). Small foreign matter falls through perforations in the bottom of the hopper tray (step 510) while large foreign matter is removed by the user (step 515). When the user is ready to begin using the machine, they press the "go" button (step 520). Pressing the go button activates the coin sorter, initializes the coin counter, and activates the fan within the waste management chute (step 525). Next the user lifts the edge of the hopper tray, dumping the coins down the entrance chute of the waste management system (step 528). As the coins go through the waste management system certain waste, such as liquids, are removed (step 530). The coins are then counted and sorted (step 540). During this step coins which do not meet the necessary physical criteria are rejected and returned to the user (step 535). As the coins are counted, the value of the coins is displayed on the monitor as well as the number of coins counted within each denomination (step 540). Manufacturers' coupons are dispensed at this time (step 540). After all of the coins are counted, the user is asked to either accept the value that has been determined and continue the transaction or to reject the value and discontinue the transaction (step 545). If the user decides to reject the stated value then the coins are returned (step 550) and the transaction ends (step 595).

If the user decides to accept the stated value and continue the transaction then they are asked whether they would like to donate, in whole or in part, the value of the coins to a charity (step 553). If the user does not wish to donate to a charity then a cash voucher is issued (step 577) and the transaction ends (step 595). If the user wishes to donate to a charity, then the user is asked to chose to which charity they wish to donate (steps 557, 560, 565, and 570). If they do not wish to donate to any of the listed charities, then the transaction ends (step 595) and the coins are returned (step 573).

After choosing to which charity they wish to donate, the user is asked if they wish to donate the total value of the coins (step 580). If the user wishes to donate the total amount then a receipt is issued which states the amount and the charity (step 583). CPU 290 records the amount donated and the charity (step 583) so that when the coins are removed from kiosk 100 the proper amounts can be deposited to the appropriate charity organizations. If the user selects to donate only a portion of the total amount, they then enter the amount to be donated (step 587). At this point a receipt for the donated portion is issued, a cash voucher for the remainder of the total amount is issued, and CPU 290 records the amount donated and the charity for later disbursement of funds (step 590).

Figure 6:
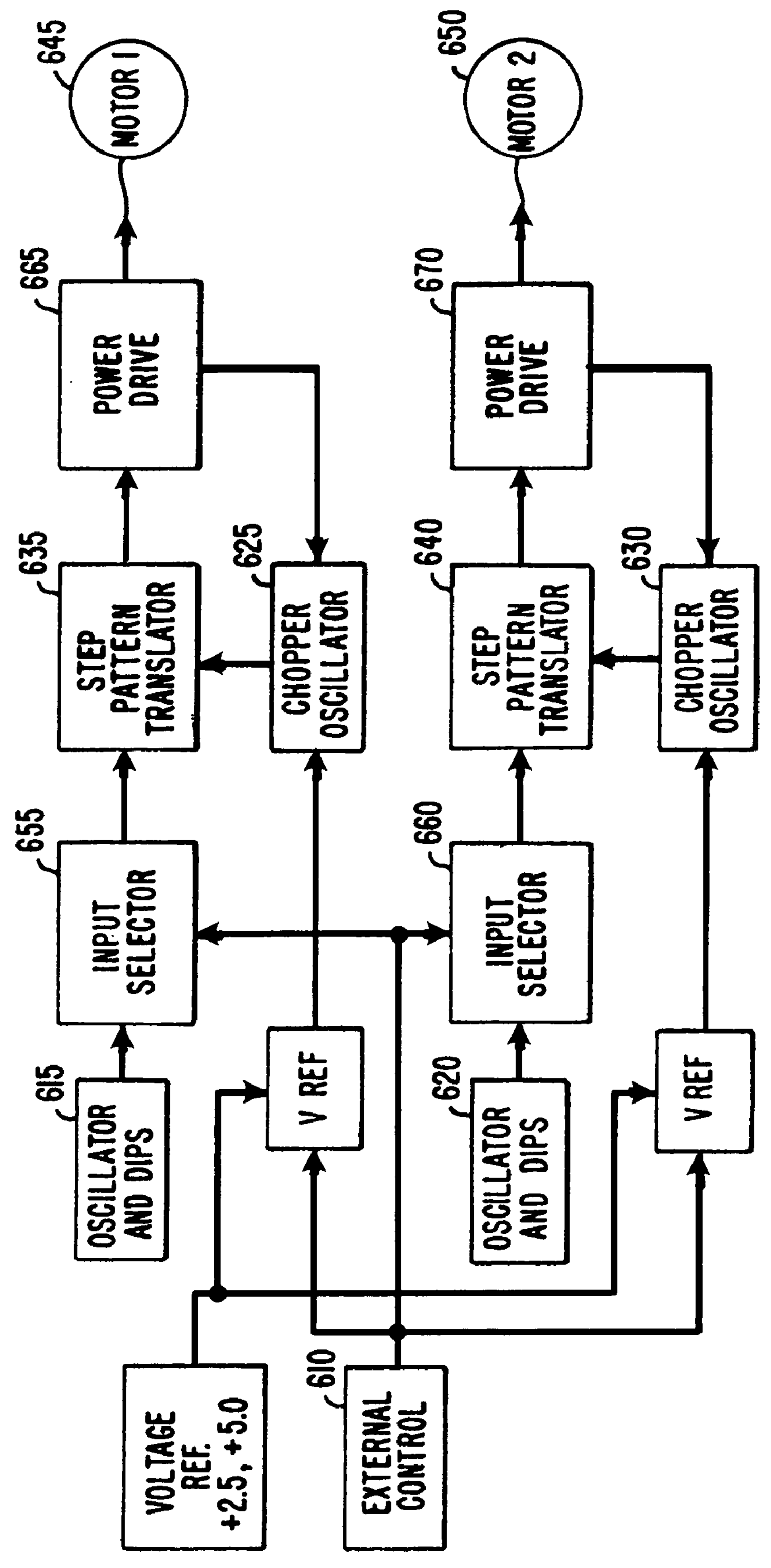
FIG. 6 is a block diagram of the stepping motor control circuitry.

FIG. 6 is a block diagram of the stepping motor control circuitry for the two stepping motors used in kiosk 100. One stepping motor controls the coupon dispenser and the other stepping motor controls the escrow tray. The circuitry for the two motors are duplicates of one another. The oscillators in blocks 615 and 620 generate the pulses which set the stepping motor rates. The dip switches in blocks 615 and 620 allow manual setting of the oscillator rates. Each motor has a second oscillator, blocks 625 and 630, which set the chopping rate. The step pattern translators, blocks 635 and 640, use both oscillators to generate the step motor patterns. Two different oscillators are used in order to maximize the power efficiency.

In operation, computer 290 determines when power should be supplied to either the coupon dispenser stepping motor 645 or the escrow tray stepping motor 650. This input is supplied via interface 610. This signal is received by either input selector 655 or 660. In the preferred embodiment, this signal is digital. Depending upon the signal, the selector determines the length of time the stepping motor will be operated. For example, one signal from interface 610 will cause the coupon dispenser (motor 645) to dispense only a single sheet of coupons while a different signal will cause two sheets of coupons to be dispensed. Similarly, one signal from interface 610 will cause the escrow tray (motor 650) to rotate in one direction thereby returning coins to the user, while a different signal will cause the opposite motor rotation thereby depositing the coins into the coin receptacle. The power drive units 665 and 670 supply, upon command, sufficient power to operate stepping motors 645 and 650.

Figure 7:
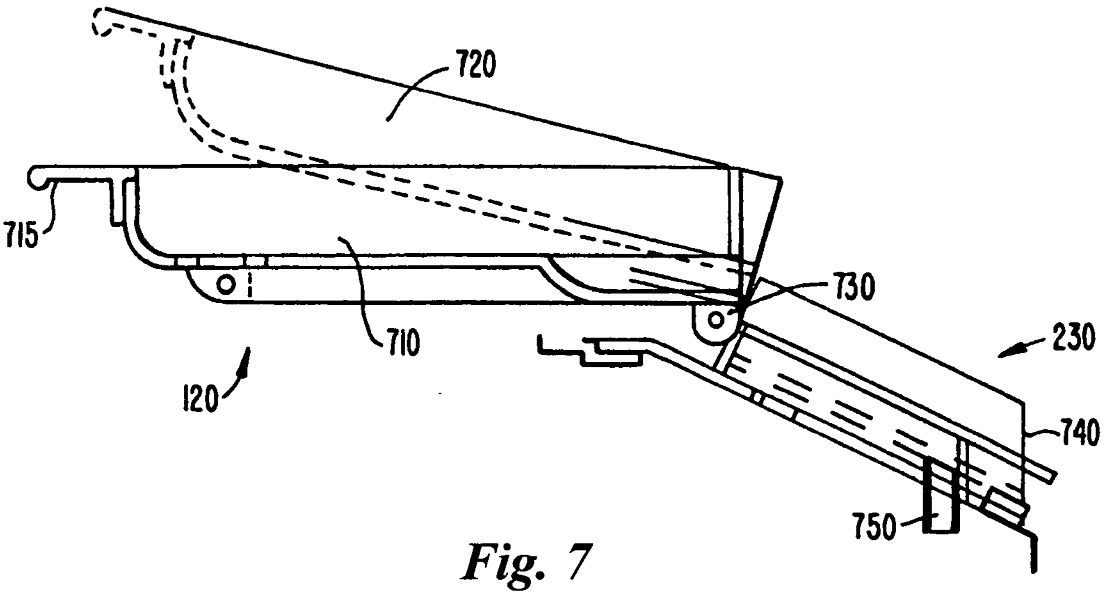
FIG. 7 is a side view of the coin tray and the waste management system.

FIG. 7 is a side view of coin tray 120 and waste management chute 230. Coin tray 120 normally is flush with the top surface of kiosk 100 (Position 710). The user places their coins in the tray and at this point removes any obvious foreign materials. When the user is ready to begin the sorting process, they lift handle 715 on coin tray 120. The tray is hinged at point 730. When tray 120 is in position 720, the coins fall through waste management chute 230. The coins leave chute 230 through opening 740 to enter the coin sorting and counting mechanism. Liquids accidently dropped into the coin hopper are funneled through spout 750 to a suitable collection receptacle.

Figure 8A:
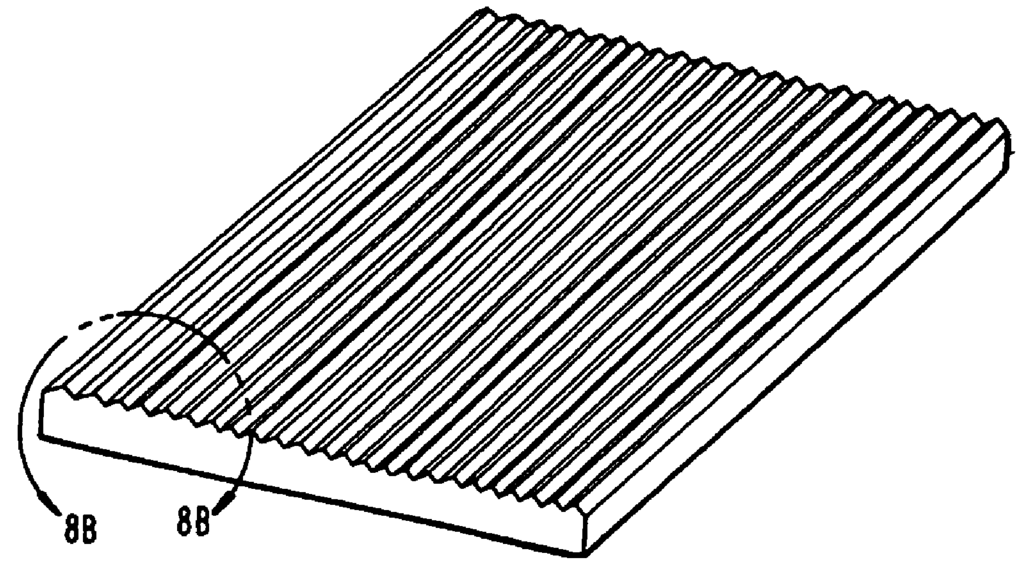
FIGS. 8A–B is a diagram of the bottom plate of the waste management system.
Figure 8B:
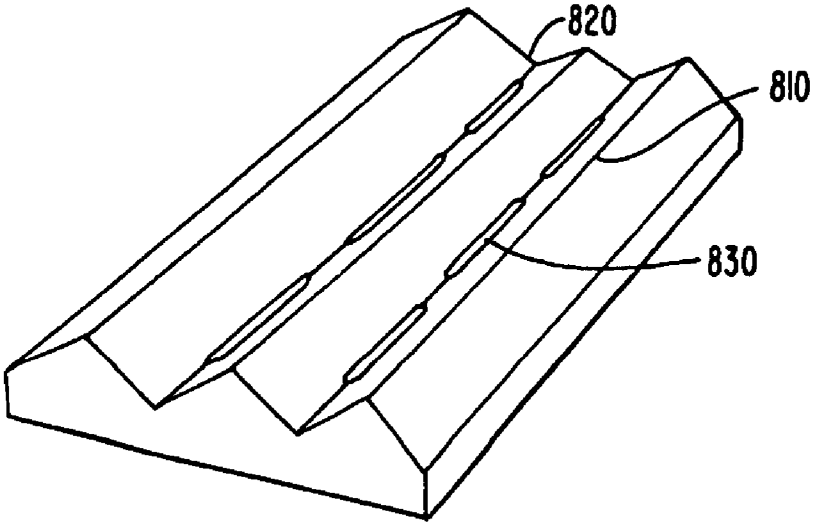

FIG. 8A is a diagram of the bottom plate of waste management system 230. FIG. 8B is an enlarged view of a small section of this plate. The surface of the plate has grooves running lengthwise, these grooves forming a series of alternating peaks 810 and valleys 820. The coins ride along the surface of the plate while liquids flow down the valleys 820, eventually flowing through perforations 830 drilled in the bottom of the valleys 820. The liquids are then funneled down spout 750, and collected. The sharp peaks 810, combined with a teflon coating, help minimize the friction caused by the liquids which may accompany the coins. This in turn helps prevent a slow down of the sorting process.

Figure 9:
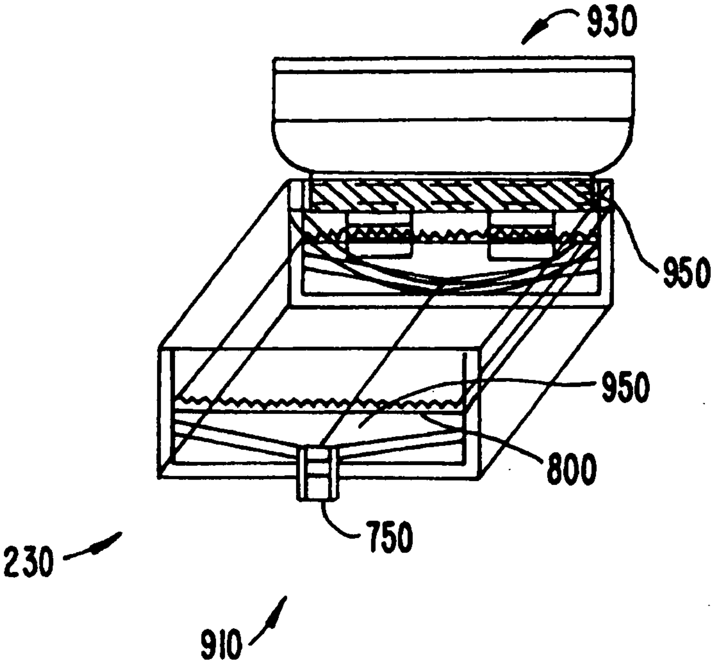
FIG. 9 is a three-dimensional view of the waste management system.

FIG. 9 is a three dimensional view of the waste management chute 230. The coins enter and travel down the chute in direction 930. As the coins travel down this chute, a fan (not shown) blows air back up the chute in direction 910. Light materials, such as small papers and lint, are blown free from the coins and out of the machine. Liquids flow through the holes in bottom plate 800, flow through spout 750, and are collected in a separate receptacle. Magnetic strips 950 along the exit edge of the coin hopper and the entry edge of the waste management chute collect ferrous objects, such as tokens and slugs, removing them from the coins.

Figure 10:
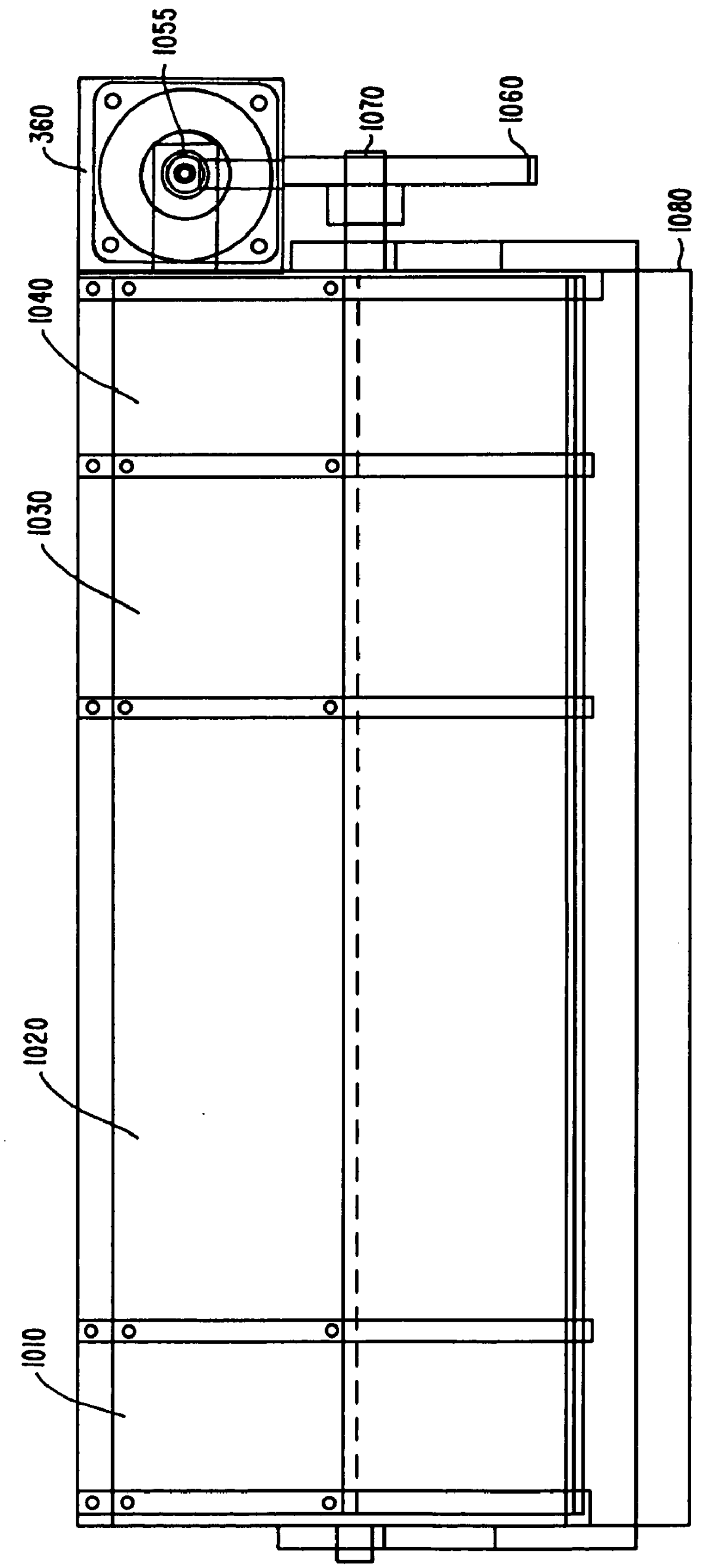
FIG. 10 is a front view of the escrow tray.

FIG. 10 is a front view of the escrow tray 105. Tray 105 is divided into four bins. Bin 1010 catches dimes from sorter 280; bin 1020 catches pennies; bin 1030 catches nickels; and bin 1040 catches quarters. Stepping motor 360 drives worm gears 1055 and 1060. When activated, stepping motor 360 moves the bottom surface 1080 of the tray along axis 1070. If the tray bottom 1080 is rotated outward, toward the user, the coins are dumped into a coin storage receptacle. If the tray bottom 1080 is rotated inward, away from the user, then the coins are dumped into a return receptacle.

Figure 11:
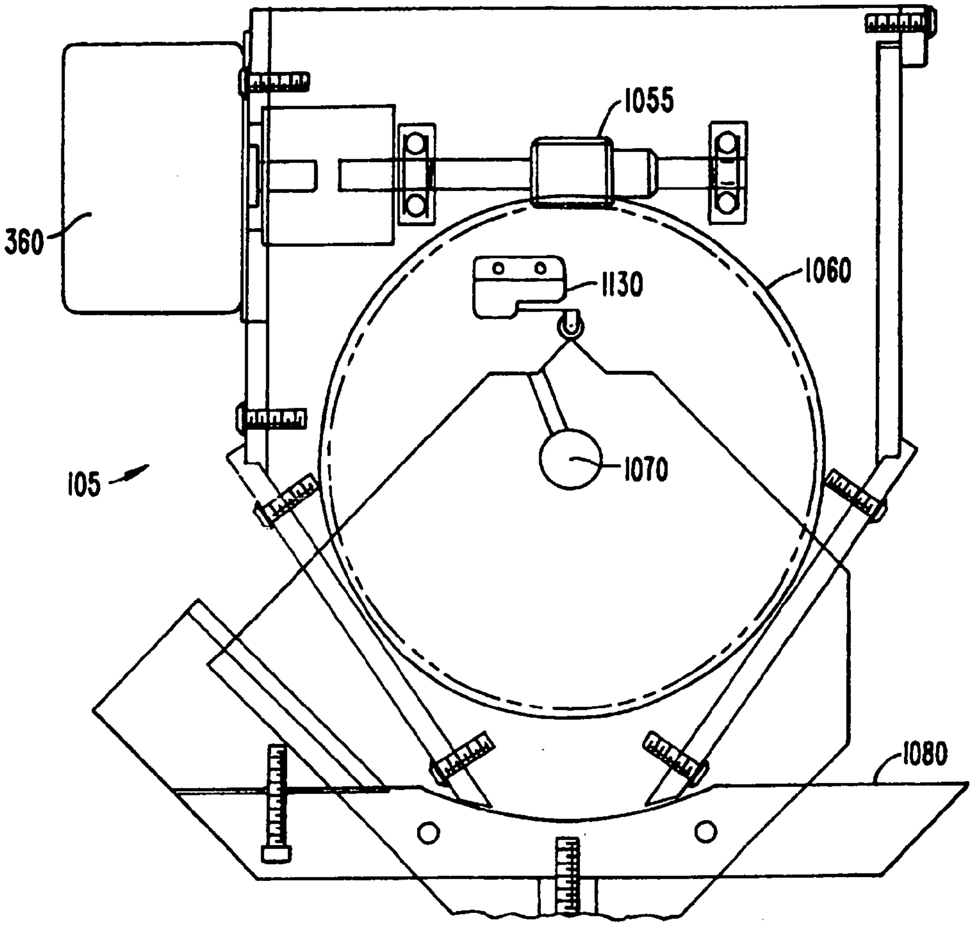
FIG. 11 is a side view of the escrow tray.

FIG. 11 is a side view of the escrow tray 105. Stepping motor 360 drives worm gears 1055 and 1060. When the stepping motor 360 is activated, worm gear 1060 is rotated along axis 1070. When gear 1060 is rotated clockwise, the bottom surface 1080 is rotated allowing the coins to be returned to the user in tray 170. When gear 1060 is rotated counter-clockwise, the bottom surface 1080 is rotated allowing the coins to be dumped into a coin depository. Microswitch 1130 prevents the stepping motor from moving the tray bottom 1080 past its pre-determined stops.

As will be understood by those familiar with the art, the present invention may be embodied in other specific forms without departing from the spirit or essential characteristics thereof. For example, the same printer could be used to print both the vouchers and periodic maintenance reports. Accordingly, disclosure of the preferred embodiments of the invention is intended to be illustrative, but not limiting, of the scope of the invention which is set forth in the following claims.

What is claimed is:

1. An apparatus for allowing an untrained user to obtain a voucher for coins comprising:
- a kiosk;
- means for receiving, from said untrained user, in a first location of said kiosk, a plurality of randomly oriented coins of arbitrary denomination;
- means for determining a total amount of said coins, wherein said means for determining is coupled to said means for receiving; and
- means for outputting from said kiosk a voucher for a value related to said total amount, wherein said means for outputting is coupled to said means for determining, and wherein said value is determined only after said means for determining has determined said total amount.

2. An apparatus, as claimed in claim 1, further comprising means for blowing light material free from the coins and out of the machine.

3. An apparatus, as claimed in claim 1, wherein said kiosk is positioned in a grocery store.

4. An apparatus, as claimed in claim 1, wherein said voucher is redeemable at said non-bank retail location.

5. An apparatus, as claimed in claim 1, wherein said voucher is redeemable at a cashier of said non-bank retail location.

6. An apparatus, as claimed in claim 1, wherein said voucher is redeemable for a value equal to said total amount less a fee.

7. An apparatus, as claimed in claim 1, wherein said voucher is redeemable for cash.

8. An apparatus, as claimed in claim 1, wherein said voucher is redeemable for credit towards purchases.

9. A machine for allowing an untrained user to obtain a voucher for coins, the machine comprising:
- a tray for receiving a plurality of randomly oriented coins of arbitrary denomination from said untrained user;
- a coin discriminator configured to receive at least some of said plurality of coins from said tray, said coin discriminator outputting a value related to a total amount of said coins; and
- a printer coupled to said coin discriminator, wherein said printer is controlled, in response to said output, to print a voucher redeemable in cash or merchandise for said value, and wherein said voucher is redeemable in a non-bank retail location in which the machine is located.

10. A machine, as claimed in claim 9, wherein said value is determined only after said discriminator has determined said total amount.

11. A machine, as claimed in claim 9, wherein said machine is located in a grocery store.

12. A machine, as claimed in claim 9, wherein said voucher is redeemable at a cashier of said non-bank retail location.

13. A machine, as claimed in claim 9, wherein said voucher is redeemable for an amount equal to said total amount less a fee.

14. A machine, as claimed in claim 9, wherein said voucher is redeemable for credit towards purchases.

15. A method for untrained users to obtain a voucher for coins comprising the steps of:

providing a kiosk having first means for discriminating among coin denominations;

receiving, from said untrained user, in a first location, a plurality of coins of arbitrary denomination;

performing a first step of cleaning said plurality of coins while said coins are in said first location by providing an opening in said first location through which debris may pass;

moving at least some of said coins from said first location to a second location in said kiosk;

performing a second step of cleaning said coins, different from said first step of cleaning, while said coins are in said second location;

discriminating, in said kiosk, said denominations of coins, using said first means;

determining a total amount of said coins;

displaying, in said kiosk, the total amount of said coins;

holding the coins in an intermediate holding area;

returning the coins to the user in response to a user input rejecting the total amount;

depositing the coins into a storage area in response to a user input accepting the total amount; and dispensing, from said kiosk, a voucher redeemable in cash or merchandise for a value related to said total amount in response to a user input accepting the total amount.

16. A method for untrained users to obtain a voucher for coins comprising the steps of:

providing a kiosk having first means for discriminating among coin denominations;

receiving, from said untrained user, in a first location of said kiosk, a plurality of coins of arbitrary denominations;

performing a first step of cleaning said plurality of coins while said coins are in said first location by providing an opening in said first location through which debris may pass;

moving at least some of said coins from said first location to a second location in said kiosk;

performing a second step of cleaning said coins, different from said first step of cleaning, while said coins are in said second location;

discriminating, in said kiosk, said denominations of coins, using said first means, after said steps of performing a first step of cleaning and performing a second step of cleaning;

determining a total amount of said coins;

dispensing, from said kiosk, a voucher redeemable in cash or merchandise for a value related to said total amount wherein said value is determined only after said steps of receiving and determining; and providing a coin storage area for storing said coins after discriminating.

17. A method for untrained users to obtain a voucher for coins comprising the steps of:

placing a kiosk in a non-bank retail location;

receiving, from said untrained user, in a first location of said kiosk, a plurality of randomly oriented coins of arbitrary denomination;

automatically determining, in said kiosk, a total amount of said coins; and outputting, from said kiosk, a voucher for a value related to said total amount.

18. A method as claimed in claim 17 wherein said value is determined only after said steps of receiving and determining.

19. A method, as claimed in claim 17, further comprising:

exchanging said voucher for cash or merchandise having a value related to said total amount.

20. A method, as claimed in claim 19, wherein said step of exchanging comprises exchanging at said non-bank retail location.

21. A method, as claimed in claim 17, wherein said voucher is redeemable at said non-bank retail location.

22. A method, as claimed in claim 17, further comprising redeeming said voucher at a cashier of said non-bank retail location.

23. A method, as claimed in claim 17, further comprising:

exchanging said voucher for cash or merchandise having a value equal to said total amount less a fee.

24. A method, as claimed in claim 17, further comprising redeeming said voucher for cash.

25. A method, as claimed in claim 17, further comprising redeeming said voucher for cash at a cashier of said non-bank retail location.

26. A method, as claimed in claim 17, further comprising redeeming said voucher for credit towards purchases.

27. A method, as claimed in claim 17, wherein said step of placing includes placing said kiosk in a grocery store.

28. A method for untrained users to obtain a voucher for coins comprising the steps of:

placing a kiosk in a non-bank retail location, said kiosk having first means for discriminating among coin denominations;

receiving from said untrained user in a tray of said kiosk a plurality of randomly oriented coins of arbitrary denomination;

removing, in said kiosk, waste included among said coins;

automatically discriminating, in said kiosk, said denominations of coins using said first means;

determining a total amount of said coins;

displaying the total amount of said coins; and outputting from said kiosk, a voucher for a value related to said total amount.

29. A method, as claimed in claim 28, further comprising:

exchanging said voucher for cash or merchandise having a value related to said total amount.

30. A method for untrained users to obtain a voucher for coins comprising the steps of:

placing a kiosk in a non-bank retail location;

receiving in a tray a plurality of coins of arbitrary denomination and other items from said untrained user, wherein said other items may include paper items;

removing at least some of said other items, including paper items, when paper items are included among said coins received in said tray;

automatically determining a total amount of said coins; and outputting a voucher from said kiosk for a value related to said total amount.

31. A method for untrained users to obtain a voucher for coins comprising the steps of:

placing a kiosk in a non-bank retail location, said kiosk having first means for discriminating among coin denominations;

receiving, in said kiosk, a plurality of randomly oriented coins of arbitrary denominations from said untrained user;

discriminating, in said kiosk, said denominations of coins using said first means;

determining a total amount of said coins;

outputting a value related to said total amount wherein said value is determined only after said steps of receiving and determining;

providing a coin storage area for storing said coins after discriminating; and automatically outputting a notification when said coin storage area is close to capacity.

* * * * *